UNITED STATES PATENT OFFICE 2,230,672

SALT TREATMENT OF CEREAL GRITS

Hugh E. Allen, Evanston, Ill., assignor of one-half to Albert G. McCaleb, Evanston, Ill.

No Drawing. Application June 23, 1937, Serial No. 149,889

1 Claim. (Cl. 99—153)

My invention contemplates and provides an improved salt treatment for grain cereal grits (sometimes called farina or non-pulverulent meal) of any one or more of the kinds usable as or in breakfast foods, or suitable for incorporation in the casing fillers of processed sausages in accordance with the teachings of my co-pending application Serial No. 147,863, filed June 12, 1937.

The hereinafter described method may be practiced successfully on the grits of wheat, corn, buckwheat, soya bean, rye, barley or oats, or any blend or mixture of such grits.

Grits treated in accordance with the teachings of the present invention are individually impregnated (not coated) with sodium chloride so that they will be thoroughly protected (without being heat sterilized and/or hermetically sealed) against infestation and deterioration by weevils and similar pests.

In applying the salt to the grits I place a suitable quantity of the latter, e. g., five hundred pounds, in a power driven mixer of the kind commonly employed for the thorough mixing of granular materials, the mixer desirably being of a type which functions continuously to move the materials being mixed in different directions toward the center from opposite ends of the container wherein the mixing is effected. The mixer also should be of a type such that additional materials may be added from the top to those in the mixer while the latter operates. Moreover, the mixer preferably should have two operating speeds, i. e., a relatively slow speed whereat it gives its contents continuous but rather gentle agitation, and a higher speed at which it gives its contents very violent agitation.

With the mixer operating at the lower of its speeds, I slowly spray upon the gently agitated grits a quantity of brine having a weight equal to from 2% to 7% of the weight of the grits in the mixer,—this brine consisting of water saturated to the maximum with common salt but containing no salt which is not in solution.

When wheat grits or corn grits are being given the salt treatment, the weight of the saturated salt solution is preferably equal to from 6% to 7% of the weight of the grits; when soya, barley or buckwheat grits are being treated the weight of the saturated salt solution is preferably equal to from 3% to 4% of the weight of the grits; and when rye or oat grits are being treated the weight of the salt solution is preferably from 2% to 4% of the weight of the grits.

The spraying of the saturated salt solution onto the gently agitated grits should occupy from two to three minutes, so that each of the grits will be dampened by and have an opportunity to absorb its proper minute proportion of the salt solution. The mixer is then operated at high speed for a period of substantially one-half hour for the purpose of developing internal heat by the continuous friction of grits on grits in the moving mass, which dissipates the brine water first from the individual grits, and then from the mass thereof, but leaves the brine salt in, but not on, the individual grits. The grits are now in such condition that, if kept relatively dry, they stand adequately protected against the depredations of weevils and similar pests.

I know of no procedure, other than the one just described, by which a relatively very small percentage of salt (i. e., a sufficient percentage which does not render the grits unsuitable for use as or in breakfast foods or in sausage casing fillers as taught in my co-pending application aforesaid) may be caused thoroughly to protect the grits against weevils and other grain pests. However, I am not the first to attempt to protect grain grits against weevil attack by the application of salt to the individual grits. As far back as 1900-1901 Gaff and Gent suggested the treatment of grits, to protect them from weevil attack, by passing the grits, on a conveyor, rapidly through a saturated solution of common salt,—the idea being to give each individual grit a saline surface coating, without permitting the brine to penetrate the grit. Later in 1921-1923 John Schreiber attempted to get a similar result by spraying a brine solution upon grits being swept along like dust in, and by the kinetic energy of, an air stream. Such methods were never commercially successful, for at least two amply sufficient reasons, both attributable to the inevitable separation of the saline coatings from the grits. When the grits lost their saline coatings, or portions thereof, as they inevitably did under the jars, jolts and friction encountered and developed when handling them in their bulk or packaged forms, they became vulnerable to weevil attack. Moreover, the separated salt sifted down through the grits so that those grits in the upper part of the package or container became substantially desalted, while those in the bottom of the package or container became intermixed with an objectionably large percentage of salt. Therefore, the hitherto suggested salt treatments of grits to protect them against attack from weevils, etc., never were able to qualify as substitutes for the more expensive, and still commonly practiced, method which consists in heat sterilizing the grits and then immediately hermetically sealing them to prevent the intrusion of destructive pests with floating dust or otherwise from the atmosphere. But since the advent of the present invention very large quantities of grits, particularly intended for use as or in breakfast foods and in the sausage industry have been thoroughly protected, by their contained salt, from the ravages of grain pests, even though the treated grits have been exposed to contaminated atmosphere for extremely long periods of time.

A very minute quantum of salt is sufficient to protect each grit from deterioration and destruction by weevils and similar pests if that salt is in but not on the grits. Grits protected by salt coatings require much more salt for the same purpose even when the coatings remain intact. As a matter of fact, these coatings soon disrupt and fall wholly or partially away with the objectionable results to which I have previously alluded. It is my opinion that in the practice of the present invention the continuous friction of grits on grits in the agitated mass performs a threefold function, i. e., firstly, rubs an appropriate minute quantity of the brine into each grit, secondly, rubs off of each grit all brine which it cannot absorb, and thirdly, develops molecular heat to drive the aqueous content of the brine from the individual grits and then from the mass of agitated grits.

What I claim as new and desire to secure by Letters Patent of the United States is:

The method of salt treating cereal grain grits which consists in gently agitating a mass of said grits, slowly spraying a concentrated salt solution on the mass while thus agitated, and then violently agitating the mass until the grits are substantially as dry and free from surface salt as they were before the spraying of the salt solution thereon.

HUGH E. ALLEN.